3,207,175
PRESSURE REGULATOR
Bruce H. Pauly, Chagrin Falls, Ohio, assignor to The Weatherhead Company, Cleveland, Ohio, a corporation of Ohio
Filed Dec. 31, 1962, Ser. No. 248,670
5 Claims. (Cl. 137—505.46)

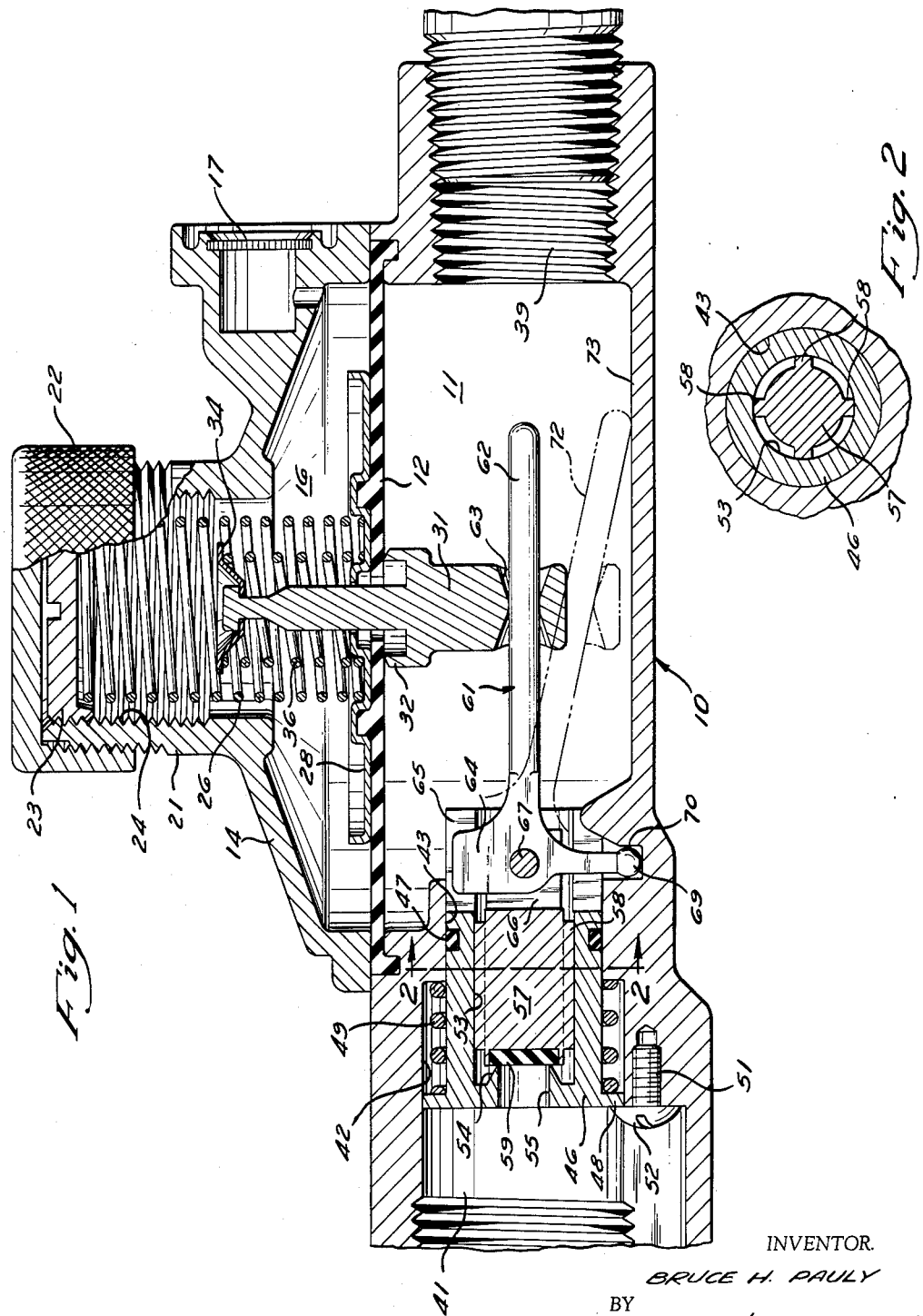
Sept. 21, 1965  B. H. PAULY  3,207,175
PRESSURE REGULATOR
Filed Dec. 31, 1962
INVENTOR.
BRUCE H. PAULY
BY
RICHEY, McNENNY & FARRINGTON
ATTORNEYS United States Patent Office 3,207,175
Patented Sept. 21, 1965

This invention relates generally to pressure regulator valves and more particularly to poppet valve structures used in pressure reducing gas pressure regulators.

Pressure regulating valves are used in liquified petroleum gas systems to supply gas at a very low pressure from the supply tank in which the gas is at a very high pressure. Because of the high pressure drop between the supply and the outlet, it is necessary for purposes of safety to prevent gas at full supply presure from reaching the outlet in the case of a failure in the pressure regulating valve. When a single stage regulator is used, the valve is designed so that ratio of the inlet valve poppet area to the area of the diaphragm, multiplied by the lever ratio of the actuating lever is such that the maximum input gas pressure acting on the area of the poppet will never over-balance the maximum allowable pressure on the downstream or outlet side of the diaphragm so that inlet pressure can never over-balance the valve and force it open. Because of the great differential between the inlet and the outlet pressures, this construction requires a relatively large area diaphragm together with a small poppet area and a high lever ratio. Where a single stage regulator is used, this arrangement requires a relatively expensive construction for the regulator valve in order to provide sufficient inlet area to provide a high flow capacity when there is maximum demand at the outlet.

In many applications, particularly where a changeover valve is employed to allow the outlet to be supplied from one of several supply tanks, pressure regulation and reduction is accomplished in tow stages, the first stage of which is incorporated into the changeover valve which selects the tank from the gas is drawn. Since the gas passes through a pressure drop through the changeover regulator valve, the gas at the inlet of the second stage pressure regulator is relatively low and would allow the use of a much smaller valve by greatly reducing the diaphragm area required to balance the poppet area exposed to the inlet from the changeover pressure regulator. However, because of the prime importance of safety in gas equipment of this type, manufacturers have been reluctant to take advantage of the two stage regulator arrangement to reduce the size of the second stage pressure regulator, since in the event of a failure of the changeover regulator, gas at full supply tank pressure could be delivered to the final stage regulator, which, if it were reduced in size, would then be over-balanced by the high pressure gas acting on the poppet and would open to allow this high pressure gas to be delivered directly to the outlet.

It is, therefore, a principal object of this invention to provide a pressure regulator for use as the second stage regulator in a two stage gas supply system which is operable in a manner so as to fail safe when the inlet is exposed to excessive pressures such as would be caused by the failure of the first stage regulator.

It is another object of this invention to provide a pressure regulator as set forth in the preceding object in which the regulator valve is rendered inoperative in the closed position when the inlet is exposed to excessive gas pressure.

It is another object of this invention to provide a pressure regulating valve as set forth in the preceding objects in which the valve seat assembly is shiftable in response to excessive inlet pressures to move with the poppet and thereby prevent the poppet from opening under excessive pressure conditions.

It is another object of this invention to provide a pressure regulator valve as set forth in the preceding objects which allows the maximum ratio of poppet area to diaphragm area so as to allow for a small size of diaphragm while providing a high rate and minimum restriction to gas flow.

It is another object of this invention to provide a pressure regulating valve as set forth in the preceding objects in which the valve will automatically become operative again when the inlet pressure has dropped to the normal level after the regulator has been rendered inoperative due to excessive inlet pressures.

Further objects and advantages will readily become apparent to those skilled in the art upon a more complete understanding of the invention of which the preferred embodiment is shown in the accompanying drawings and described in the following detailed description.

In the drawings:

FIGURE 1 is a vertical cross-sectional view through a pressure regulator valve incorporating the present invention; and FIGURE 2 is a cross-sectional view through the valve assembly taken on line 2—2 of FIGURE 1.

The pressure regulator valve has a body 10 which defines a pressure chamber 11 which is closed off on its upper side by a flexible diaphragm 12. The diaphragm 12 is held in place by means of a cover 14 secured to the upper side of body 10 by suitable means such as screws or the like. The cover 14 defines a upper chamber 16 between the cover and the diaphragm 12, and this chamber 16 is vented to the atmosphere by the vent 17 so that upper chamber 16 is at atmospheric pressure at all times.

The cover 14 is provided with a centrally located spring housing 21 which is covered by a threaded cap 22. A threaded plug 23 is fitted within a threaded bore 24 in the spring housing 21 to vary the bias applied to the control spring 26 which abuts at its lower end against a diaphragm plate 28 resting on the upper side of diaphragm 12. A stem 31 extends through the diaphragm 12 between the pressure chamber 11 and the upper chamber 16. Stem 31 has a flange 32 adapted to bear against the underside of diaphragm 12, and is retained in place by means of a spring retainer washer 34 on its upper end and a spring 36 extending between the retainer 34 and the diaphragm 28 so as to bias the flange 32 into contact with the underside of diaphragm 12. It will therefore be seen that depending upon the pressure within the pressure chamber 11, the diaphragm 12 and stem 31 will move vertically against the bias of control spring 26 and movement of the stem 31 can be used to operate the valve mechanism for varying the pressure within the pressure chamber 11 to a level where it will balance the control spring 26.

The pressure chamber 11 is provided with an outlet 39 formed in the body 10, and is also provided with an inlet 41 through which the pressure regulator is connected to the first stage regulator in the system. Inlet 41 is provided with an inlet bore portion 42 extending inward from the open end and terminating in a reduced bore portion 43 extending between the inlet bore 42 and the pressure chamber 11. A cylindrical valve seat member 46 is slidably mounted within the reduced bore 43 and is provided with an O-ring seal 47 to prevent leakage between the valve seat member 46 and the bore 43. At its outer end, the valve seat member 46 has a radial flange 48 lying within the inlet bore 42 and a helical compression spring 49 is located around the valve seat member 46 to abut at one end against the flange 48 and at the other end against the end of inlet bore 42. Thus, the spring 49 serves to bias the valve seat member 46 in the direction away from the pressure chamber 11. Movement of the valve seat member in this direction is limited by the stop screw 51 which is threadedly engaged in the body 10 and has a head 52 overlying the flange 48 so as to limit movement of the valve seat member 46 under the action of spring 49.

The valve seat member 46 has an axial bore 53 extending outward from the pressure chamber 11 to terminate at a valve seat 54 adjacent the reduced diameter inlet passage 55 through which gas is admitted from the inlet 41. A valve plunger 57 is slidably mounted within the bore 53 by means of longitudinal guide ribs 58 which provide clearance to allow gas to flow past the plunger into the pressure chamber 11. On its end, plunger 57 is provided with a resilient elastomeric seal 59 adapted to engage the valve seat 54 to prevent the flow of gas into the pressure chamber 11.

Valve plunger 57 is moved to open and close the valve by means of actuating lever 61 mounted within the pressure chamber 11. The actuating lever 61 has a rod portion 62 which is fitted within an opening 63 in the lower end of stem 31. A head portion 64 of the actuating lever extends within aligned slots 65 and 66 formed in the valve seat member 46 and the plunger 57, respectively. Actuating lever 61 is pivotally attached to the plunger 57 by means of the pivot pin 67, and in turn the actuating lever is pivotally mounted on the body 10 by means of a ball portion 69 which fits within a recess 70 on body 10.

When the pressure within pressure chamber 11 drops below the value determined by the biasing force of control spring 26, the stem 31 moves downward and by rotating the actuating lever 61 about the pivot ball 69 will move the valve plunger 57 inward to move the seal 59 away from the valve seat 54 and allow gas from the inlet bore 41 to flow into the pressure chamber 11 until the pressure rises to a level where upward movement of the diaphragm 12 causes the actuating lever 61 to shift the plunger 57 outwardly to close off the inlet opening 55.

Because the plunger 57 is exposed to fluid pressure in the inlet 51, it is subject to a biasing force determined by the inlet pressure and the diameter of the inlet passage 55 the valve seat member 46. This biasing force tends to open the valve and therefore excessive inlet pressure may cause the plunger 57 to be shifted away from the valve seat and thereby open the valve regardless of the pressure in chamber 11 acting on diaphragm 12 and tending, through lever 61 to hold the valve in the closed position.

To prevent the pressure at inlet 41 from opening the valve plunger 57, the valve seat member 46 is mounted to move within the bores 42 and 43 if the pressure of inlet bore 41 should approach that level which would cause the valve plunger 57 to be opened by the pressure forces. Since the effective area of valve seat member 46 is exposed to the inlet pressure over the full diameter of bore 43, the same pressure which tends to bias the valve plunger 57 away from valve seat 54 will also be tending to shift the valve seat member 46 in the same direction. Therefore, the spring 49 is chosen to provide a biasing force on the valve seat member 46 such that it will yield at a predetermined pressure level so as to cause the valve seat member 46 to slide inwardly toward the pressure chamber 11. When this occurs, the valve plunger 57 will be moved inwardly and will rotate the actuating lever 61 about the ball portion 69 until it reaches a limiting position as shown in dotted lines at 72 in which the end of the rod portion 62 comes into contact with the bottom wall 73 of pressure chamber 11 and positively prevents any further movement of the plunger 57. Thus, since the gas pressure force acting on the valve seat member 46 will hold the valve seat 54 in sealing contact with the seal 59, it will be seen that the valve cannot open under these excessive conditions and no gas can flow into the pressure chamber 11.

When the excessive pressure condition is removed and the pressure in the inlet 41 returns to normal, the spring 49 will then be able to overcome the pressure force acting on the valve seat member 46 and shift the valve seat member 46 back into contact with the stop screw head 52 in the position shown in FIGURE 1. The regulator valve will again become operative in the normal manner automatically without any resetting or other action required. Because the valve operates in this manner under excessive pressure in inlet bore 41 to positively prevent fluid flow through the valve, the inlet passage 55 may be made relatively large to allow a high rate of flow through the valve during maximum demand conditions, and the area of diaphragm 12 can be made relatively small as determined by the normal operating conditions of the valve without regard to safety requirements because of possible excessive pressure conditions in the inlet bore 41. The lever ratio of the actuating lever 61, which is the ratio of the lever arms from the pivot pin 67 to the stem 31 and to the ball portion 69, can be made relatively low so as to provide a relatively large amount of movement to the valve plunger 57 in response to the relatively small movement of the diaphragm 12 to improve the sensitivity and accuracy of the pressure regulator during normal operating conditions.

Although the preferred embodiment of this invention has been shown and described in detail, it is recognized that the invention is not limited to this particular form and various modifications and rearrangements such as may occur to those skilled in the art may be resorted to without departing from the scope of the invention as defined in the following claims.

What is claimed is:

1. A pressure regulator comprising a body defining a pressure chamber, an inlet to said pressure chamber, an outlet from said pressure chamber, a valve seat member slidably mounted in said body at said inlet, said valve seat member making a sliding sealing fit with said body and having a passage therethrough, spring means biasing said valve seat member away from said pressure chamber, first stop means on said body for limiting movement of said valve seat member away from said pressure chamber, a valve seat on said valve seat member at said passage at the pressure chamber side thereof, a valve closure member mounted for movement to and from said valve seat on the pressure chamber side thereof, control means responsive to pressure in said pressure chamber to shift said valve closure member to and from said valve seat, second stop means to limit movement of said valve closure member away from said valve seat, said spring means urging said valve seat member against said first stop means with a predetermined force, and means responsive to pressures in said inlet greater than a predetermined pressure overcoming said predetermined force and shifting said valve seat member toward said valve closure member and shifting said valve closure member against said last mentioned stop means to close said passage.

2. A pressure regulator comprising a body defining a pressure chamber, an inlet to said pressure chamber, an outlet from said pressure chamber, a valve seat member slidably mounted in said body at said inlet, said valve seat member making a sliding sealing fit with said body and having a passage therethrough, spring means biasing said valve seat member away from said pressure chamber, first stop means on said body engageable by said valve seat member to limit movement of said valve seat member away from said pressure chamber, a valve seat on said valve seat member at said passage on the pressure chamber side thereof, a valve closure member slidably mounted on said valve seat member for movement to and from said valve seat on the pressure chamber side thereof, means responsive to pressure in said pressure chamber, linkage means interconnecting said pressure responsive means and said valve closure member to shift said valve closure member to and from said valve seat, second stop means on said body engageable by said linkage means to limit movement of said valve closure member away from said valve seat, said spring means urging said valve seat member against said first stop means with a predetermined force, and means responsive to pressures in said inlet greater than a predetermined pressure overcoming said predetermined force and shifting said valve seat member toward said valve closure means to close said passage.

3. A pressure regulator comprising a body defining a pressure chamber, an inlet to said pressure chamber, an outlet from said pressure chamber, a valve seat member slidably mounted in said body at said inlet, said valve seat member making a sliding sealing fit with said body and having a passage therethrough, spring means biasing said valve seat member away from said pressure chamber, first stop means on said body limiting movement of said valve seat member away from said pressure chamber, a valve seat on said valve seat member at said passage on the pressure chamber side thereof, a valve closure member mounted for movement to and from said valve seat on the pressure chamber side thereof, diaphragm means closing off said pressure chamber and movable in response to the pressure therein, a lever pivotally mounted on said body and connected to said valve closure member to shift said valve closure member to and from said valve seat, means interconnecting said lever and said diaphragm, second stop means on said body engageable by said lever and operable to limit movement of said valve closure member away from said valve seat, said spring means urging said valve seat member against said first stop means with a predetermined force, and means responsive to pressures in said inlet greater than a predetermined pressure overcoming said predetermined force and shifting said valve seat member toward said valve closure member whereby said valve seat member engages said valve closure member when said lever is in engagement with said second stop means to close said passage.

4. A pressure regulator comprising a body defining a pressure chamber, an inlet to said pressure chamber, an outlet from said pressure chamber, a bore in said body between said inlet and said pressure chamber, a valve seat member slidably mounted in said bore, said valve seat member making a sliding sealing fit with said bore and having a passage therethrough, said valve seat member having a portion exposed to fluid pressure in said inlet whereby fluid pressure in said inlet produces a biasing force tending to slide said valve seat member toward said pressure chamber, spring means biasing said valve seat member away from said pressure chamber, first stop means engageable by said valve seat member to limit movement of said valve seat member away from said pressure chamber, said spring urging said valve seat member against said first stop means with a predetermined force, said biasing force overcoming said predetermined force and shifting said valve seat member away from said first stop means when the pressure in said inlet is greater than a predetermined pressure, a valve seat on said valve seat member at said passage on the pressure chamber side thereof, a valve closure member mounted for slidable movement to and from said valve seat, second stop means to limit movement of said valve closure member away from said valve seat to allow said valve seat member to positively engage said valve closure member to close off said passage when said valve seat member is moved inwardly toward said pressure chamber away from said first mentioned stop means, and control means responsive to pressure in said pressure chamber to shift said valve closure member to and from said valve seat when said valve seat member is adjacent said first mentioned stop means.

5. A pressure regulator comprising a body defining a pressure chamber, said pressure chamber having an open side, a diaphragm closing off said pressure chamber at said open side, an inlet to said pressure chamber, an outlet from said pressure chamber, a bore in said body extending between said inlet and said pressure chamber, a valve seat member slidably mounted in said bore, said valve seat member making a sliding sealing fit with said body and having a portion exposed to fluid pressure in said inlet whereby said inlet pressure biases said valve seat member toward said pressure chamber, spring means biasing said valve seat member away from said pressure chamber, stop means on said body to limit movement of said valve seat member away from said pressure chamber, said spring means urging said valve seat member against said stop means with a predetermined force, pressures in said inlet greater than a predetermined pressure acting on said portion exposed to fluid pressure in said inlet overcoming said predetermined force and shifting said valve seat member away from said stop means, a passage extending into said valve seat member from the inlet side thereof, a bore in said valve seat member extending from said passage to said pressure chamber, a valve seat on said valve seat member adjacent the junction of said passage and said bore, a valve closure member slidably mounted in said valve seat member bore for movement to and from said valve seat, means on said valve closure member to make sealing contact with said valve seat, a lever pivotally mounted on said body and operably connected to said diaphragm, said lever also being operatively connected to said valve closure member to shift said valve closure member to and from said valve seat in response to movement of said diaphragm, said lever having a portion engageable with said body to limit movement of said valve closure member away from said valve seat, whereby excess pressure in said inlet shifts said valve seat member against said spring means into contact with said valve closure member and shifts said valve closure member and said lever to cause said lever to engage said body and hold said valve seat tightly against said valve closure member independently of the pressure within said pressure chamber.

References Cited by the Examiner
UNITED STATES PATENTS 2,691,988 10/54 Weatherhead ____ 137—505.46 XR
3,054,420 9/62 Williams _____ 137—508 XR
3,090,596 5/63 Gifford _____ 251—333

FOREIGN PATENTS 1,133,926 11/56 France.
   8,602 2/80 Germany.

ISADOR WEIL, *Primary Examiner.*

UNITED STATES PATENT OFFICE
CERTIFICATE OF CORRECTION

Patent No. 3,207,175                          September 21, 1965

Bruce H. Pauly

It is hereby certified that error appears in the above numbered patent requiring correction and that the said Letters Patent should read as corrected below.

Column 5, line 52, after "spring" insert -- means --.

Signed and sealed this 29th day of March 1966.

(SEAL)
Attest:

ERNEST W. SWIDER                        EDWARD J. BRENNER
Attesting Officer                           Commissioner of Patents